US012207379B2

(12) United States Patent
Zhu et al.

(10) Patent No.: US 12,207,379 B2
(45) Date of Patent: Jan. 21, 2025

(54) MICROWAVE HEATING DEVICE WITH REFLECTION PROTECTION

(71) Applicant: Sichuan University, Sichuan (CN)

(72) Inventors: Huacheng Zhu, Sichuan (CN); Yang Yang, Sichuan (CN)

(73) Assignee: Sichuan University, Sichuan (CN)

( * ) Notice: Subject to any disclaimer, the term of this patent is extended or adjusted under 35 U.S.C. 154(b) by 734 days.

(21) Appl. No.: 17/480,354

(22) Filed: Sep. 21, 2021

(65) Prior Publication Data

US 2022/0007472 A1 Jan. 6, 2022

(30) Foreign Application Priority Data

Dec. 8, 2020 (CN) ......................... 202011421962.6

(51) Int. Cl.

*H05B 6/70* (2006.01)
*F27D 11/12* (2006.01)
*H01P 1/26* (2006.01)
*H01P 1/38* (2006.01)

(52) U.S. Cl.

CPC ............. *H05B 6/707* (2013.01); *H01P 1/262* (2013.01); *H01P 1/38* (2013.01); *F27D 11/12* (2013.01)

(58) Field of Classification Search

CPC ................................ H01P 1/262; H05B 6/707
See application file for complete search history.

(56) References Cited

FOREIGN PATENT DOCUMENTS

| | | | | |
|---|---|---|---|---|
| CN | 101613138 A | * | 12/2009 | |
| CN | 102784436 A | * | 11/2012 | ............... A61N 5/02 |
| CN | 106993347 A | * | 7/2017 | ........... H05B 6/6402 |
| CN | 107256999 A | * | 10/2017 | .............. H01P 1/262 |
| SU | 985856 A1 | * | 12/1982 | |

OTHER PUBLICATIONS

CN-106993347-A (Zhou Xiaojun) Jul. 28, 2017 [retrieved on Jul. 12, 2024]. Retrieved from Espacenet Database, translation by EPO and Google. (Year: 2017).*

CN-107256999-A (Xu Yong) Oct. 17, 2017 [retrieved on Jul. 12, 2024]. Retrieved from Espacenet Database, translation by EPO and Google. (Year: 2017).*

(Continued)

*Primary Examiner* — John J Norton
*Assistant Examiner* — Franklin Jefferson Wang

(57) ABSTRACT

A microwave heating device with reflection protection belongs to a technical field of microwave applications. A first port of a circulator is connected to a microwave generator, and a second port of the circulator is connected to a microwave transmission device. A water load comprises a waveguide section, a metamaterial structure layer and the absorption tube. One end of the waveguide section is connected to a third port of the circulator, and the other end is sealed by a metal plate. The metamaterial structure layer is arranged in the waveguide section, and a center of the metamaterial structure layer has an accommodation space. The absorption tube is arranged along an internal wall of the accommodation space with a spiral extending form. Both ends of the absorption tube penetrate the waveguide section, and coolant flows in the absorption tube. Relative dielectric constants of the metamaterial structure layer gradually increase.

8 Claims, 2 Drawing Sheets

(56) References Cited

OTHER PUBLICATIONS

CN-102784436-A (Ruopeng Liu) Nov. 21, 2012 [retrieved on Jul. 12, 2024]. Retrieved from Espacenet Database, translation by EPO and Google. (Year: 2012).*
SU-985856-A1 (Baushev Yurij S) Dec. 30, 1982 [retrieved on Oct. 9, 2024]. Retrieved from Espacenet Database, translation by EPO and Google. (Year: 1982).*
CN-101613138-A (Zhu Guangfu) Dec. 30, 2009 [retrieved on Oct. 9, 2024]. Retrieved from Espacenet Database, translation by EPO and Google. (Year: 2009).*

* cited by examiner

MICROWAVE HEATING DEVICE WITH REFLECTION PROTECTION

CROSS REFERENCE OF RELATED APPLICATION

The present invention claims priority under 35 U.S.C. 119(a-d) to CN 202011421962.6, filed Dec. 8, 2020.

BACKGROUND OF THE PRESENT INVENTION

Field of Invention

The present invention relates to a technical field of microwave applications, and more particularly to a microwave device with reflection protection.

Description of Related Arts

As a new type of high-efficiency clean energy, microwave energy has the characteristics of high efficiency, energy saving, selective heating, and no pollution, and has been widely used in food processing, chemical, pharmaceutical and other fields. In recent years, microwave heating has been applied in ore pretreatment, forging, sintering, and carbothermal reduction of metal oxide ore, which is an effective way to improve metal recovery rate, product conversion rate, and product purity. Reflection protection, absorbing load and impedance matching are essential for the stable operation of microwave energy industrial systems. In terms of reflection protection, two microwave devices, namely an isolator and a circulator, are mainly used.

Circulators and waveguide pin tuner are widely used in various industrial microwave heating equipment and microwave plasma equipment. In a microwave system, in order to prevent the microwave reflected from the damaging the microwave source, a circulator is used to transmit the reflected energy to the three-port matched load for absorbing. As a common terminal matching load, the water load is mainly composed of a waveguide and a water cavity for absorbing microwaves. The water cavity is mainly made of polytetrafluoroethylene and water flows in it. The reflected microwaves are absorbed by water flowing in the water load and converted into heat energy. The more energy the load absorbs per unit time, the greater the temperature rise in the water load. Therefore, for different powers, the flow rate in the water load is also different, otherwise the temperature rise of the water load is too high, which will bring a significant change to the relative permittivity of water, resulting in a mismatch of the impedance, thus reducing the water load's ability to absorb microwaves.

The conventional water load needs additional pins for impedance matching. However, water temperature change, uneven water flow, and doped air bubbles in the water load will all cause impedance mismatch, which weakens the microwave energy absorption of the water load, thereby weakening the protection on the microwave source. The power and water flow rate will affect the microwave absorption of the water load. Therefore, the water load may not be able to achieve impedance matching in a wide range of flow rate and temperature, which affects the working life of the microwave system and poses a safety hazard.

SUMMARY OF THE PRESENT INVENTION

To overcome the above defects, an object of the present invention is to provide a device to protect microwave equipment, mainly by improving the absorption capacity of microwave energy so as to protect the microblog system and improve the service life of the equipment. Accordingly, in order to accomplish the above object, the present invention provides:

a microwave heating device with reflection protection, comprising: a microwave generator (22), a circulator (23), a water load (24), a microwave transmission device (25), and a reaction chamber (26); wherein a first port of the circulator (23) is connected to the microwave generator (22), and a second port of the circulator (23) is connected to the microwave transmission device (25); the microwave transmission device (25) is connected to the reaction chamber (26); the water load (24) comprises a waveguide section (21), a metamaterial structure layer (3) and an absorption tube (16); one end of the waveguide section (21) is connected to a third port of the circulator (23), and the other end is sealed by a metal plate; the metamaterial structure layer (3) is arranged in the waveguide section (21); a center of the metamaterial structure layer (3) has an accommodation space (4); the absorption tube (16) is arranged along an internal wall of the accommodation space (4) with a spiral extending form; both ends of the absorption tube (16) penetrate the waveguide section (21), and water flows in the absorption tube (16); relative dielectric constants of materials forming the metamaterial structure layer (3) gradually increase from outside to inside, so that microwaves passing through the metamaterial structure layer (3) are converged in the accommodation space (4). With the foregoing structure, the microwaves generated by the microwave generator (22) enter from the first port of the circulator (23), and then exit from the second port of the circulator (23), so as to be transmitted to the reaction chamber (26) through the microwave transmission device (25) to participate in the reaction. The microwave transmission device (25) is a conventional waveguide or the like. Reflected microwave enter from the second port of the circulator (23), and then pass through the third port of the circulator (23) to enter the waveguide section (21) of the water load (24). After entering the waveguide section (21), the reflected microwaves pass through the metamaterial structure layer (3) and are converged in the accommodation space (4). The absorption tube (16) is arranged along the internal wall of the accommodation space (4) with the spiral extending form, and the water flows in the absorption tube (16) efficiently absorbs the reflected microwaves. The absorption tube (16) is in a spiral shape to help uniform the water flow and increase an area for absorbing the microwaves. In addition, the special structure of the metamaterial structure layer (3) allows the microwaves to focus microwave energy on a central area, which inhibits the microwaves from being reflected back to a microwave source, thereby protecting the microwave source. The metamaterial structure layer (3) improves a microwave energy absorption rate, so that the microwave energy can be efficiently absorbed and utilized. Due to properties of the metamaterial structure layer (3), the reflected microwaves can enter the metamaterial structure layer (3) from multiple directions. The microwave energy in metamaterials can only converge toward the center until the microwaves are completely absorbed. The microwave energy can be focused on the central area by the metamaterial structure layer (3) because the relative dielectric constants of the materials of the metamaterial structure layer (3) gradually increase from outside to inside. Such increase can be a continuous smooth gradual increase or a stepped increase. The relative dielectric constant of an outermost material part of the metamaterial structure layer (3) is the smallest, and the relative dielectric constant of an innermost material part of the metamaterial structure layer (3) is the largest. With such arrangement, it can be considered that the microwaves passing through the metamaterial structure layer (3) are constantly refracted towards the accommodation space (4), so that when the microwaves passing through the metamaterial structure layer (3) only enter the accommodation space (4) and will not escape. A conventional water load requires pin deployment, but adjustment criterion is difficult to be determined since the microwave absorption capacity of the load varies with temperature. A position of the pin is determined according to a small water temperature range, which means the pin will lose its adjusting function when the water temperature changes too much, leading to high requirements for protection devices. The conventional water load has a low tolerance to the dielectric coefficient. During absorption of high-power microwaves, as the water temperature changes, the dielectric coefficient will also change, which will further affect absorption capacity of the water load. The working frequency of the conventional water load is relatively low, the bandwidth is relatively narrow, and the size is not well controlled. Furthermore, the conventional water load cannot achieve a wide range of power capacity, the water temperature is too high, impedance may not match, resulting in poor microwave absorption. The microwave heating device with the reflection protection of the present invention adopts a graded refractive index metamaterial and uses a high absorbing efficiency water load having an electromagnetic black hole structure. Therefore, the pin is no longer needed and impedance matching of the water load is no longer required. Even if the power is high, the temperature rise is too much, and dielectric properties of the water changes, the microwave absorption capacity will not be weakened. The microwave heating device of the present invention can cope with a wide range of power capacity. Even if the water temperature changes greatly, the metamaterial structure layer (3) can converge the microwave energy in the accommodation space (4). Therefore, the water load of the present invention can protect microwave equipment, mainly by improving the absorption capacity of microwave energy so as to protect the microblog system and improve the service life of the equipment.

Preferably, the metamaterial structure layer (3) comprises multiple ring columns (5) nested in sequence from inside to outside; the accommodation space (4) is a cylindrical space with a radius of r; a radius of the metamaterial structure layer (3) is R; a relative dielectric constant of an external space of the metamaterial structure layer (3) is $\varepsilon_0$; the relative dielectric constants at each position point of the metamaterial structure layer (3) constitutes a step function; a distance between the position point and a center of the accommodation space (4) is d, and R>d>r; each step of the step function intersects with another function $\varepsilon(d)=\varepsilon_0(R/d)^2$. With the foregoing structure, according to the conventional theory, the metamaterial structure layer (3) converges the microwaves to the accommodation space (4), and the relative dielectric constant of the material should approach the function $\varepsilon(d)=\varepsilon_0(R/d)^2$, which means the relative dielectric constants at each point of the metamaterial structure layer (3) are different, except for those on an axis of the accommodation space (4). Since there is air between the metamaterial structure layer (3) and the waveguide section (21), $\varepsilon_0$ is the relative dielectric constant of the air. However, such a structure is difficult to realize in practice. The present invention uses the multiple ring columns (5), which are nested in sequence from inside to the outside, to form the metamaterial structure layer (3). Therefore, only the relative dielectric constants of the ring column (5) at corresponding positions are required to approach the function $\varepsilon(d)=\varepsilon_0(R/d)^2$, and then the metamaterial structure layer (3) whose relative dielectric constants gradually increase from outside to inside can be formed. For example, if an internal diameter of a certain ring column (5) is d1 and an external diameter is d2, the relative dielectric constant of this ring column (5) is regarded as the relative dielectric constants the position points which is d1-d2 away from the axis of the accommodation space (4). Then the relative dielectric constants and the position points of all ring column (5) are presented as the step function on a coordinate system. It is only necessary to intersect each step of the step function with the function $\varepsilon(d)=\varepsilon_0(R/d)^2$ to approach the function $\varepsilon(d)=\varepsilon_0(R/d)^2$, so as to converge the microwaves. For example, the internal diameter of one ring column (5) is d1, the external diameter is d2, and the relative dielectric constant is ε1. On the coordinate system, this ring column (5) is presented as a horizontal line segment with abscissas d1-d2 and ordinate ε1, and the line segment intersects with the function $\varepsilon(d)=\varepsilon_0(R/d)^2$. The multiple ring columns (5) nested in sequence from inside to outside may adopt virtual nesting. For example, a material with gradual relative dielectric constants can be regarded as the ring columns (5) nested in sequence from inside to outside even if it is an integrated material. Such virtual nesting also belongs to the nesting concept protected by the present invention, which is convenient for processing and reduces costs.

Preferably, each of the ring columns (5) has multiple hollow cavities (6), and two ends of the multiple hollow cavities (6) are extended to a top surface and a bottom surface of a corresponding ring column (5) respectively. With the foregoing structure, the ring column (5) can use polyvinylidene fluoride as a substrate, and the relative dielectric constant of the ring column (5) can be changed by setting the hollow cavity (6) on the ring column (5). The dielectric constant of the ring column (5) can be changed through a duty cycle method, so that the dielectric constants gradually increase from inside to outside, and can be calculated and tested through conventional theories.

Preferably, cross sections of the hollow cavities (6) of an outer ring column (5) are larger than cross sections of the hollow cavities (6) of an inner ring column (5). With the foregoing structure, the larger the cross section of the hollow cavity (6) is, the smaller the relative dielectric constant of the ring column (5) will be, and vice versa. The cross sections of the hollow cavities (6) of the ring column (5) become smaller and smaller from outside to inside, so the relative dielectric constants of the metamaterial structure layer (3) gradually increase from outside to inside.

Preferably, the hollow cavities (6) of the ring columns (5) are evenly spaced; a quantity of the hollow cavities (6) on each of the ring columns (5) is equal. With the foregoing structure, the larger the cross section of the hollow cavity (6) is, the smaller the relative dielectric constant of the ring column (5) will be, and vice versa. The cross sections of the hollow cavities (6) of the ring column (5) become smaller and smaller from outside to inside, so the relative dielectric constants of the metamaterial structure layer (3) gradually increase from outside to inside.

Preferably, cross sections of the hollow cavities (6) are circular, elliptical or polygonal. With the foregoing structure, the hollow cavity (6) can adopt a variety of cross-sectional shapes which are all able to to change the relative dielectric constants of the ring columns (5). The circular cross section is commonly used.

Preferably, an opening (7) is arranged at a top of the waveguide section (21), and a press cap (8) covers the opening (7); a concave circular groove (9) is provided at a bottom of the press cap (8), which is fitted on a top of the metamaterial structure layer (3); the metamaterial structure layer (3) is sandwiched between the press cap (8) and a bottom of the waveguide section (21). With the foregoing structure, the concave circular groove (9) is fitted on the top of the metamaterial structure layer (3), so that the metamaterial structure layer (3) is sandwiched between the press cap (8) and the bottom of the waveguide section (21). There is no gap between the top and bottom of the metamaterial structure layer (3), preventing the microwaves from escaping from the accommodation space (4).

Preferably, the press cap (8) has a communicating cavity (10); the concave circular groove (9) has multiple micro holes (11), in such a manner that all the hollow cavities (6) as well as the accommodation space (4) communicate with the communicating cavity (10) through the micro holes (11); a safety valve (12) is provided on the press cap (8) to relieve pressure when the communicating cavity (10) is over-pressured; an L-shaped positioning plate (13) is provided at a bottom of the metamaterial structure layer (3); an L-shaped positioning groove is arranged at the bottom of the waveguide section (21), which matches with the L positioning plate (13). With the foregoing structure, there are several micro-holes (11) on the concave circular groove (9), and the L-shaped positioning plate (13) is arranged at the bottom of the metamaterial structure layer (3). When the L-shaped positioning plate (13) is matched in the L-shaped positioning groove, a position and an angle of the metamaterial structure layer (3) are uniquely determined, which are adjusted during designing in advance to ensure a best effect and avoid the need to adjust the position of the metamaterial structure layer (3) every time. At the same time, each of the hollow cavities (6) corresponds to one of the micro holes (11) communicating with the communicating cavity (10). The accommodation space (4) also communicates with the communicating cavity (10) through corresponding micro holes (11). When the air pressure in the hollow cavities (6) or the accommodation space (4) is too high, the air enters the communicating cavity (10) through the micro holes (11), and then the pressure is released through the safety valve (12) to ensure safety. The micro holes (11) are very small and like a cut-off waveguide, so the microwaves will not escape therefrom. During working, the press cap (8) is opened, and the metamaterial structure layer (3) is put into the waveguide section (21) from the opening (7) at the top of the waveguide section (21); the metamaterial structure layer (3) is positioned on the L-shaped positioning groove at the bottom of the waveguide section (21) through the L-shaped positioning plate (13), and then the press cap (8) is closed so that the concave circular groove (9) at the bottom of the press cap (8) fits on the top of the metamaterial structure layer (3). At this time, each of the hollow cavities (6) corresponds to one of the micro holes (11) communicating with the communicating cavity (10), and the accommodation space (4) also communicates with the communicating cavity (10) through corresponding micro holes (11). The microwaves are converged in the accommodation space (4) when passing through the metamaterial structure layer (3). When the air pressure in the hollow cavities (6) or the accommodation space (4) is too high, the air enters the communicating cavity (10) through the micro holes (11), and then the pressure is released through the safety valve (12).

Preferably, the two ends of the absorption tube (16) are connected to an inlet tube (17) and an outlet tube (19) respectively; the inlet tube (17) and the outlet tube (19) are wrapped with metal sleeves. With the foregoing structure, the flowing water in the absorption tube (16) flows in from the inlet tube (17) and then flows out from the outlet tube (19). the inlet tube (17) and the outlet tube (19) are wrapped with the metal sleeves to prevent the microwaves from escaping from the inlet tube (17) and the outlet tube (19), so that the microwaves are constantly reflected in the inlet tube (17) and the outlet tube (19) and are fully absorbed by the water.

Beneficial effects of the present invention are as follows.

The present invention provides the microwave heating device with the reflection protection, which belongs to a technical field of microwave applications. The first port of the circulator is connected to the microwave generator, and the second port of the circulator is connected to the microwave transmission device. The water load comprises the waveguide section, the metamaterial structure layer and the absorption tube. One end of the waveguide section is connected to the third port of the circulator, and the other end is sealed by the metal plate. The metamaterial structure layer is arranged in the waveguide section, and the center of the metamaterial structure layer has the accommodation space. The absorption tube is arranged along the internal wall of the accommodation space with the spiral extending form. Both ends of the absorption tube penetrate the waveguide section, and the water flows in the absorption tube. The relative dielectric constants of the materials forming the metamaterial structure layer gradually increase from outside to inside, so that the microwaves passing through the metamaterial structure layer are converged in the accommodation space. The microwave heating device of the present invention can protect microwave equipment, mainly by improving the absorption capacity of microwave energy so as to protect the microblog system and improve the service life of the equipment.

Figure 1:
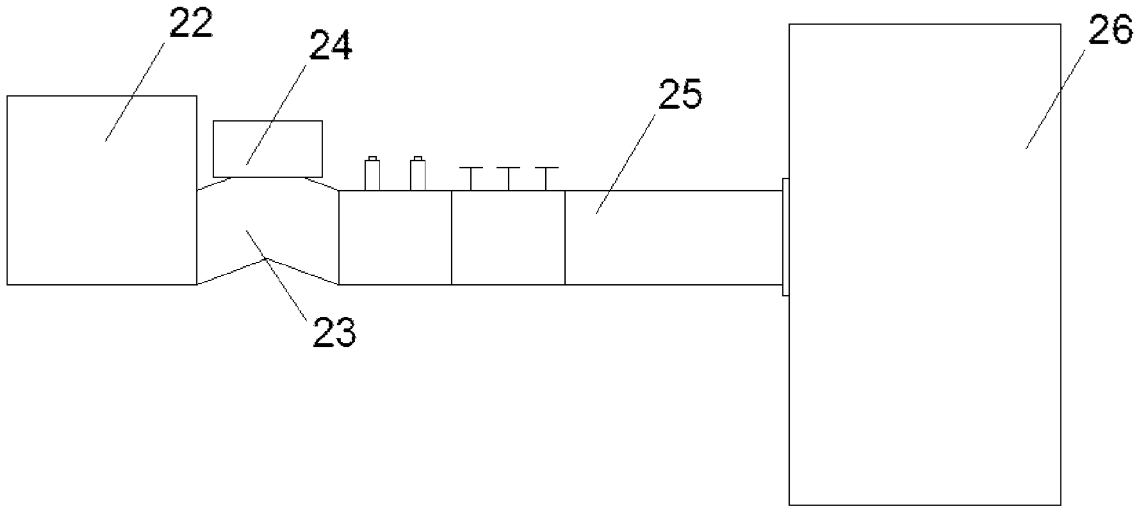
FIG. 1 is a structural view of a microwave heating device according to the present invention.

Element reference: 3—metamaterial structure layer, 4—accommodation space, 5—ring column, 6—hollow cavity, 7—opening, 8—press cap, 9—concave circular groove, 10—communicating cavity, 11—micro hole, 12—safety valve, 13—L-shaped positioning plate, 16—absorption tube, 17—inlet tube, 19—outlet tube, 21—waveguide section, 22—microwave generator, 23—circulator, 24—water load, 25—microwave transmission device, 26—reaction chamber.

DETAILED DESCRIPTION OF THE PREFERRED EMBODIMENT

Referring to the drawings and embodiments, the present invention will be further described below. However, the present invention is not limited to the following embodiments.

Embodiment 1

Figure 2:
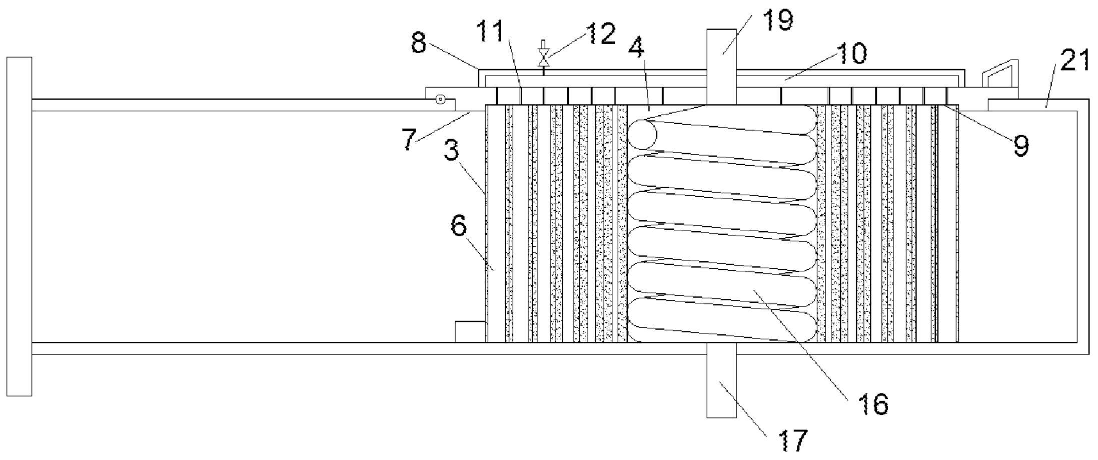
FIG. 2 is a cross-sectional view of a waveguide section of a water load according to the present invention.
Figure 3:
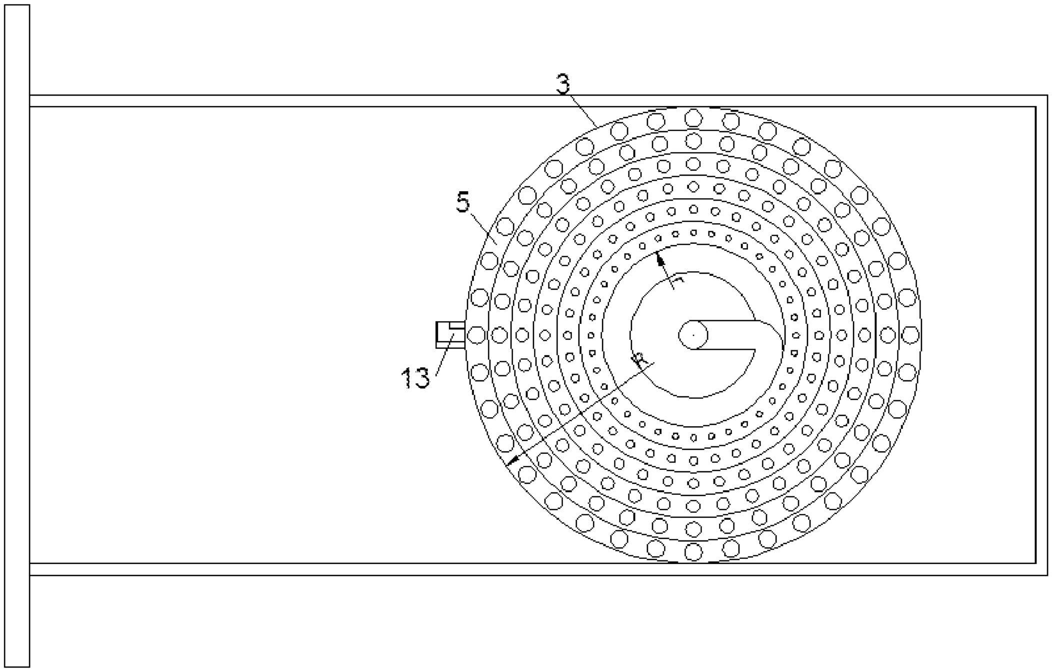
FIG. 3 is a top cross-sectional view of the waveguide section of the water load according to the present invention.
Figure 4:
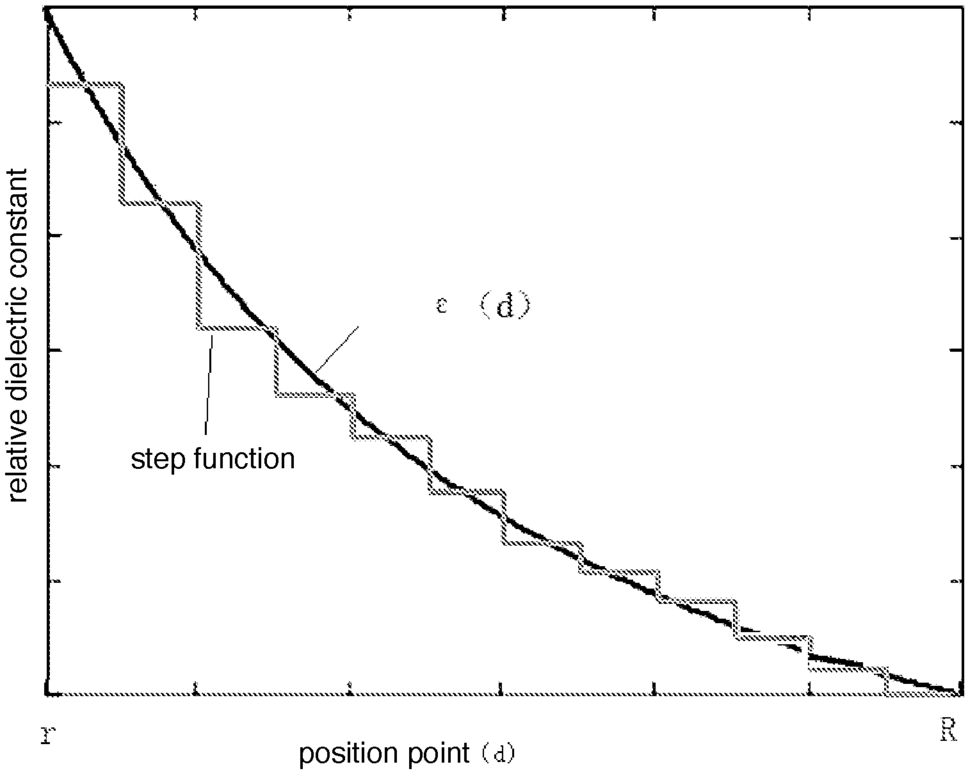
FIG. 4 is a diagram of a function εd and a step function of the present invention in a coordinate system.

Referring to FIGS. 1-4, a microwave heating device with reflection protection is provided, comprising: a microwave generator 22, a circulator 23, a water load 24, a microwave transmission device 25, and a reaction chamber 26; wherein a first port of the circulator 23 is connected to the microwave generator 22, and a second port of the circulator 23 is connected to the microwave transmission device 25; the microwave transmission device 25 is connected to the reaction chamber 26; the water load 24 comprises a waveguide section 21, a metamaterial structure layer 3 and an absorption tube 16; one end of the waveguide section 21 is connected to a third port of the circulator 23, and the other end is sealed by a metal plate; the metamaterial structure layer 3 is arranged in the waveguide section 21; a center of the metamaterial structure layer 3 has an accommodation space 4; the absorption tube 16 is arranged along an internal wall of the accommodation space 4 with a spiral extending form; both ends of the absorption tube 16 penetrate the waveguide section 21, and water flows in the absorption tube 16; relative dielectric constants of materials forming the metamaterial structure layer 3 gradually increase from outside to inside, so that microwaves passing through the metamaterial structure layer 3 are converged in the accommodation space 4. With the foregoing structure, the microwaves generated by the microwave generator 22 enter from the first port of the circulator 23, and then exit from the second port of the circulator 23, so as to be transmitted to the reaction chamber 26 through the microwave transmission device 25 to participate in the reaction. The microwave transmission device 25 is a conventional waveguide or the like. Reflected microwave enter from the second port of the circulator 23, and then pass through the third port of the circulator 23 to enter the waveguide section 21 of the water load 24. After entering the waveguide section 21, the reflected microwaves pass through the metamaterial structure layer 3 and are converged in the accommodation space 4. The absorption tube 16 is arranged along the internal wall of the accommodation space 4 with the spiral extending form, and the water flows in the absorption tube 16 efficiently absorbs the reflected microwaves. The absorption tube 16 is in a spiral shape to help uniform the water flow and increase an area for absorbing the microwaves. In addition, the special structure of the metamaterial structure layer 3 allows the microwaves to focus microwave energy on a central area, which inhibits the microwaves from being reflected back to a microwave source, thereby protecting the microwave source. The metamaterial structure layer 3 improves a microwave energy absorption rate, so that the microwave energy can be efficiently absorbed and utilized. Due to properties of the metamaterial structure layer 3, the reflected microwaves can enter the metamaterial structure layer 3 from multiple directions. The microwave energy in metamaterials can only converge toward the center until the microwaves are completely absorbed. The microwave energy can be focused on the central area by the metamaterial structure layer 3 because the relative dielectric constants of the materials of the metamaterial structure layer 3 gradually increase from outside to inside. Such increase can be a continuous smooth gradual increase or a stepped increase. The relative dielectric constant of an outermost material part of the metamaterial structure layer 3 is the smallest, and the relative dielectric constant of an innermost material part of the metamaterial structure layer 3 is the largest. With such arrangement, it can be considered that the microwaves passing through the metamaterial structure layer 3 are constantly refracted towards the accommodation space 4, so that when the microwaves passing through the metamaterial structure layer 3 only enter the accommodation space 4 and will not escape. A conventional water load requires pin deployment, but adjustment criterion is difficult to be determined since the microwave absorption capacity of the load varies with temperature. A position of the pin is determined according to a small water temperature range, which means the pin will lose its adjusting function when the water temperature changes too much, leading to high requirements for protection devices. The conventional water load has a low tolerance to the dielectric coefficient. During absorption of high-power microwaves, as the water temperature changes, the dielectric coefficient will also change, which will further affect absorption capacity of the water load. The working frequency of the conventional water load is relatively low, the bandwidth is relatively narrow, and the size is not well controlled. Furthermore, the conventional water load cannot achieve a wide range of power capacity, the water temperature is too high, impedance may not match, resulting in poor microwave absorption. The microwave heating device with the reflection protection of the present invention adopts a graded refractive index metamaterial and uses a high absorbing efficiency water load having an electromagnetic black hole structure. Therefore, the pin is no longer needed and impedance matching of the water load is no longer required. Even if the power is high, the temperature rise is too much, and dielectric properties of the water changes, the microwave absorption capacity will not be weakened. The microwave heating device of the present invention can cope with a wide range of power capacity. Even if the water temperature changes greatly, the metamaterial structure layer 3 can converge the microwave energy in the accommodation space 4. Therefore, the water load of the present invention can protect microwave equipment, mainly by improving the absorption capacity of microwave energy so as to protect the microblog system and improve the service life of the equipment.

Embodiment 2

Referring to FIGS. 1-4, a microwave heating device with reflection protection is provided, comprising: a microwave generator 22, a circulator 23, a water load 24, a microwave transmission device 25, and a reaction chamber 26; wherein a first port of the circulator 23 is connected to the microwave generator 22, and a second port of the circulator 23 is connected to the microwave transmission device 25; the microwave transmission device 25 is connected to the reaction chamber 26; the water load 24 comprises a waveguide section 21, a metamaterial structure layer 3 and an absorption tube 16; one end of the waveguide section 21 is connected to a third port of the circulator 23, and the other end is sealed by a metal plate; the metamaterial structure layer 3 is arranged in the waveguide section 21; a center of the metamaterial structure layer 3 has an accommodation space 4; the absorption tube 16 is arranged along an internal wall of the accommodation space 4 with a spiral extending form; both ends of the absorption tube 16 penetrate the waveguide section 21, and water flows in the absorption tube 16; relative dielectric constants of materials forming the metamaterial structure layer 3 gradually increase from outside to inside, so that microwaves passing through the metamaterial structure layer 3 are converged in the accommodation space 4. With the foregoing structure, the microwaves generated by the microwave generator 22 enter from the first port of the circulator 23, and then exit from the second port of the circulator 23, so as to be transmitted to the reaction chamber 26 through the microwave transmission device 25 to participate in the reaction. The microwave transmission device 25 is a conventional waveguide or the like. Reflected microwave enter from the second port of the circulator 23, and then pass through the third port of the circulator 23 to enter the waveguide section 21 of the water load 24. After entering the waveguide section 21, the reflected microwaves pass through the metamaterial structure layer 3 and are converged in the accommodation space 4. The absorption tube 16 is arranged along the internal wall of the accommodation space 4 with the spiral extending form, and the water flows in the absorption tube 16 efficiently absorbs the reflected microwaves. The absorption tube 16 is in a spiral shape to help uniform the water flow and increase an area for absorbing the microwaves. In addition, the special structure of the metamaterial structure layer 3 allows the microwaves to focus microwave energy on a central area, which inhibits the microwaves from being reflected back to a microwave source, thereby protecting the microwave source. The metamaterial structure layer 3 improves a microwave energy absorption rate, so that the microwave energy can be efficiently absorbed and utilized. Due to properties of the metamaterial structure layer 3, the reflected microwaves can enter the metamaterial structure layer 3 from multiple directions. The microwave energy in metamaterials can only converge toward the center until the microwaves are completely absorbed. The microwave energy can be focused on the central area by the metamaterial structure layer 3 because the relative dielectric constants of the materials of the metamaterial structure layer 3 gradually increase from outside to inside. Such increase can be a continuous smooth gradual increase or a stepped increase. The relative dielectric constant of an outermost material part of the metamaterial structure layer 3 is the smallest, and the relative dielectric constant of an innermost material part of the metamaterial structure layer 3 is the largest. With such arrangement, it can be considered that the microwaves passing through the metamaterial structure layer 3 are constantly refracted towards the accommodation space 4, so that when the microwaves passing through the metamaterial structure layer 3 only enter the accommodation space 4 and will not escape. A conventional water load requires pin deployment, but adjustment criterion is difficult to be determined since the microwave absorption capacity of the load varies with temperature. A position of the pin is determined according to a small water temperature range, which means the pin will lose its adjusting function when the water temperature changes too much, leading to high requirements for protection devices. The conventional water load has a low tolerance to the dielectric coefficient. During absorption of high-power microwaves, as the water temperature changes, the dielectric coefficient will also change, which will further affect absorption capacity of the water load. The working frequency of the conventional water load is relatively low, the bandwidth is relatively narrow, and the size is not well controlled. Furthermore, the conventional water load cannot achieve a wide range of power capacity, the water temperature is too high, impedance may not match, resulting in poor microwave absorption. The microwave heating device with the reflection protection of the present invention adopts a graded refractive index metamaterial and uses a high absorbing efficiency water load having an electromagnetic black hole structure. Therefore, the pin is no longer needed and impedance matching of the water load is no longer required. Even if the power is high, the temperature rise is too much, and dielectric properties of the water changes, the microwave absorption capacity will not be weakened. The microwave heating device of the present invention can cope with a wide range of power capacity. Even if the water temperature changes greatly, the metamaterial structure layer 3 can converge the microwave energy in the accommodation space 4. Therefore, the water load of the present invention can protect microwave equipment, mainly by improving the absorption capacity of microwave energy so as to protect the microblog system and improve the service life of the equipment.

The metamaterial structure layer 3 comprises multiple ring columns 5 nested in sequence from inside to outside; the accommodation space 4 is a cylindrical space with a radius of r; a radius of the metamaterial structure layer 3 is R; a relative dielectric constant of an external space of the metamaterial structure layer 3 is $\varepsilon_0$; the relative dielectric constants at each position point of the metamaterial structure layer 3 constitutes a step function; a distance between the position point and a center of the accommodation space 4 is d, and R>d>r; each step of the step function intersects with another function $\varepsilon d=\varepsilon_0 R/d^2$. With the foregoing structure, according to the conventional theory, the metamaterial structure layer 3 converges the microwaves to the accommodation space 4, and the relative dielectric constant of the material should approach the function $\varepsilon d=\varepsilon_0 R/d^2$, which means the relative dielectric constants at each point of the metamaterial structure layer 3 are different, except for those on an axis of the accommodation space 4. Since there is air between the metamaterial structure layer 3 and the waveguide section 21, $\varepsilon_0$ is the relative dielectric constant of the air. However, such a structure is difficult to realize in practice. The present invention uses the multiple ring columns 5, which are nested in sequence from inside to the outside, to form the metamaterial structure layer 3. Therefore, only the relative dielectric constants of the ring column 5 at corresponding positions are required to approach the function $\varepsilon d=\varepsilon_0 R/d^2$, and then the metamaterial structure layer 3 whose relative dielectric constants gradually increase from outside to inside can be formed. For example, if an internal diameter of a certain ring column 5 is d1 and an external diameter is d2, the relative dielectric constant of this ring column 5 is regarded as the relative dielectric constants the position points which is d1-d2 away from the axis of the accommodation space 4. Then the relative dielectric constants and the position points of all ring column 5 are presented as the step function on a coordinate system. It is only necessary to intersect each step of the step function with the function $\varepsilon d=\varepsilon_0 R/d^2$ to approach the function $\varepsilon d=\varepsilon_0 R/d^2$, so as to converge the microwaves. For example, the internal diameter of one ring column 5 is d1, the external diameter is d2, and the relative dielectric constant is $\varepsilon 1$. On the coordinate system, this ring column 5 is presented as a horizontal line segment with abscissas d1-d2 and ordinate $\varepsilon 1$, and the line segment intersects with the function $\varepsilon d=\varepsilon_0 R/d^2$. The multiple ring columns 5 nested in sequence from inside to outside may adopt virtual nesting. For example, a material with gradual relative dielectric constants can be regarded as the ring columns 5 nested in sequence from inside to outside even if it is an integrated material. Such virtual nesting also belongs to the nesting concept protected by the present invention, which is convenient for processing and reduces costs.

Embodiment 3

Referring to FIGS. 1-4, a microwave heating device with reflection protection is provided, comprising: a microwave generator 22, a circulator 23, a water load 24, a microwave transmission device 25, and a reaction chamber 26; wherein a first port of the circulator 23 is connected to the microwave generator 22, and a second port of the circulator 23 is connected to the microwave transmission device 25; the microwave transmission device 25 is connected to the reaction chamber 26; the water load 24 comprises a waveguide section 21, a metamaterial structure layer 3 and an absorption tube 16; one end of the waveguide section 21 is connected to a third port of the circulator 23, and the other end is sealed by a metal plate; the metamaterial structure layer 3 is arranged in the waveguide section 21; a center of the metamaterial structure layer 3 has an accommodation space 4; the absorption tube 16 is arranged along an internal wall of the accommodation space 4 with a spiral extending form; both ends of the absorption tube 16 penetrate the waveguide section 21, and water flows in the absorption tube 16; relative dielectric constants of materials forming the metamaterial structure layer 3 gradually increase from outside to inside, so that microwaves passing through the metamaterial structure layer 3 are converged in the accommodation space 4. With the foregoing structure, the microwaves generated by the microwave generator 22 enter from the first port of the circulator 23, and then exit from the second port of the circulator 23, so as to be transmitted to the reaction chamber 26 through the microwave transmission device 25 to participate in the reaction. The microwave transmission device 25 is a conventional waveguide or the like. Reflected microwave enter from the second port of the circulator 23, and then pass through the third port of the circulator 23 to enter the waveguide section 21 of the water load 24. After entering the waveguide section 21, the reflected microwaves pass through the metamaterial structure layer 3 and are converged in the accommodation space 4. The absorption tube 16 is arranged along the internal wall of the accommodation space 4 with the spiral extending form, and the water flows in the absorption tube 16 efficiently absorbs the reflected microwaves. The absorption tube 16 is in a spiral shape to help uniform the water flow and increase an area for absorbing the microwaves. In addition, the special structure of the metamaterial structure layer 3 allows the microwaves to focus microwave energy on a central area, which inhibits the microwaves from being reflected back to a microwave source, thereby protecting the microwave source. The metamaterial structure layer 3 improves a microwave energy absorption rate, so that the microwave energy can be efficiently absorbed and utilized. Due to properties of the metamaterial structure layer 3, the reflected microwaves can enter the metamaterial structure layer 3 from multiple directions. The microwave energy in metamaterials can only converge toward the center until the microwaves are completely absorbed. The microwave energy can be focused on the central area by the metamaterial structure layer 3 because the relative dielectric constants of the materials of the metamaterial structure layer 3 gradually increase from outside to inside. Such increase can be a continuous smooth gradual increase or a stepped increase. The relative dielectric constant of an outermost material part of the metamaterial structure layer 3 is the smallest, and the relative dielectric constant of an innermost material part of the metamaterial structure layer 3 is the largest. With such arrangement, it can be considered that the microwaves passing through the metamaterial structure layer 3 are constantly refracted towards the accommodation space 4, so that when the microwaves passing through the metamaterial structure layer 3 only enter the accommodation space 4 and will not escape. A conventional water load requires pin deployment, but adjustment criterion is difficult to be determined since the microwave absorption capacity of the load varies with temperature. A position of the pin is determined according to a small water temperature range, which means the pin will lose its adjusting function when the water temperature changes too much, leading to high requirements for protection devices. The conventional water load has a low tolerance to the dielectric coefficient. During absorption of high-power microwaves, as the water temperature changes, the dielectric coefficient will also change, which will further affect absorption capacity of the water load. The working frequency of the conventional water load is relatively low, the bandwidth is relatively narrow, and the size is not well controlled. Furthermore, the conventional water load cannot achieve a wide range of power capacity, the water temperature is too high, impedance may not match, resulting in poor microwave absorption. The microwave heating device with the reflection protection of the present invention adopts a graded refractive index metamaterial and uses a high absorbing efficiency water load having an electromagnetic black hole structure. Therefore, the pin is no longer needed and impedance matching of the water load is no longer required. Even if the power is high, the temperature rise is too much, and dielectric properties of the water changes, the microwave absorption capacity will not be weakened. The microwave heating device of the present invention can cope with a wide range of power capacity. Even if the water temperature changes greatly, the metamaterial structure layer 3 can converge the microwave energy in the accommodation space 4. Therefore, the water load of the present invention can protect microwave equipment, mainly by improving the absorption capacity of microwave energy so as to protect the microblog system and improve the service life of the equipment.

The metamaterial structure layer 3 comprises multiple ring columns 5 nested in sequence from inside to outside; the accommodation space 4 is a cylindrical space with a radius of r; a radius of the metamaterial structure layer 3 is R; a relative dielectric constant of an external space of the metamaterial structure layer 3 is $\varepsilon_0$; the relative dielectric constants at each position point of the metamaterial structure layer 3 constitutes a step function; a distance between the position point and a center of the accommodation space 4 is d, and R>d>r; each step of the step function intersects with another function $\varepsilon d=\varepsilon_0 R/d^2$. With the foregoing structure, according to the conventional theory, the metamaterial structure layer 3 converges the microwaves to the accommodation space 4, and the relative dielectric constant of the material should approach the function $\varepsilon d=\varepsilon_0 R/d^2$, which means the relative dielectric constants at each point of the metamaterial structure layer 3 are different, except for those on an axis of the accommodation space 4. Since there is air between the metamaterial structure layer 3 and the waveguide section 21, $\varepsilon_0$ is the relative dielectric constant of the air. However, such a structure is difficult to realize in practice. The present invention uses the multiple ring columns 5, which are nested in sequence from inside to the outside, to form the metamaterial structure layer 3. Therefore, only the relative dielectric constants of the ring column 5 at corresponding positions are required to approach the function $\varepsilon d=\varepsilon_0 R/d^2$, and then the metamaterial structure layer 3 whose relative dielectric constants gradually increase from outside to inside can be formed. For example, if an internal diameter of a certain ring column 5 is d1 and an external diameter is d2, the relative dielectric constant of this ring column 5 is regarded as the relative dielectric constants the position points which is d1-d2 away from the axis of the accommodation space 4. Then the relative dielectric constants and the position points of all ring column 5 are presented as the step function on a coordinate system. It is only necessary to intersect each step of the step function with the function $\varepsilon d=\varepsilon_0 R/d^2$ to approach the function $\varepsilon d=\varepsilon_0 R/d^2$, so as to converge the microwaves. For example, the internal diameter of one ring column 5 is d1, the external diameter is d2, and the relative dielectric constant is ε1. On the coordinate system, this ring column 5 is presented as a horizontal line segment with abscissas d1-d2 and ordinate ε1, and the line segment intersects with the function $\varepsilon d=\varepsilon_0 R/d^2$. The multiple ring columns 5 nested in sequence from inside to outside may adopt virtual nesting. For example, a material with gradual relative dielectric constants can be regarded as the ring columns 5 nested in sequence from inside to outside even if it is an integrated material. Such virtual nesting also belongs to the nesting concept protected by the present invention, which is convenient for processing and reduces costs.

Each of the ring columns 5 has multiple hollow cavities 6, and two ends of the multiple hollow cavities 6 are extended to a top surface and a bottom surface of a corresponding ring column 5 respectively. With the foregoing structure, the ring column 5 can use polyvinylidene fluoride as a substrate, and the relative dielectric constant of the ring column 5 can be changed by setting the hollow cavity 6 on the ring column 5. The dielectric constant of the ring column 5 can be changed through a duty cycle method, so that the dielectric constants gradually increase from inside to outside, and can be calculated and tested through conventional theories.

Cross sections of the hollow cavities 6 of an outer ring column 5 are larger than cross sections of the hollow cavities 6 of an inner ring column 5. With the foregoing structure, the larger the cross section of the hollow cavity 6 is, the smaller the relative dielectric constant of the ring column 5 will be, and vice versa. The cross sections of the hollow cavities 6 of the ring column 5 become smaller and smaller from outside to inside, so the relative dielectric constants of the metamaterial structure layer 3 gradually increase from outside to inside.

The hollow cavities 6 of the ring columns 5 are evenly spaced; a quantity of the hollow cavities 6 on each of the ring columns 5 is equal. With the foregoing structure, the larger the cross section of the hollow cavity 6 is, the smaller the relative dielectric constant of the ring column 5 will be, and vice versa. The cross sections of the hollow cavities 6 of the ring column 5 become smaller and smaller from outside to inside, so the relative dielectric constants of the metamaterial structure layer 3 gradually increase from outside to inside.

Cross sections of the hollow cavities 6 are circular, elliptical or polygonal. With the foregoing structure, the hollow cavity 6 can adopt a variety of cross-sectional shapes which are all able to to change the relative dielectric constants of the ring columns 5. The circular cross section is commonly used.

An opening 7 is arranged at a top of the waveguide section 21, and a press cap 8 covers the opening 7; a concave circular groove 9 is provided at a bottom of the press cap 8, which is fitted on a top of the metamaterial structure layer 3; the metamaterial structure layer 3 is sandwiched between the press cap 8 and a bottom of the waveguide section 21. With the foregoing structure, the concave circular groove 9 is fitted on the top of the metamaterial structure layer 3, so that the metamaterial structure layer 3 is sandwiched between the press cap 8 and the bottom of the waveguide section 21. There is no gap between the top and bottom of the metamaterial structure layer 3, preventing the microwaves from escaping from the accommodation space 4.

The press cap 8 has a communicating cavity 10; the concave circular groove 9 has multiple micro holes 11, in such a manner that all the hollow cavities 6 as well as the accommodation space 4 communicate with the communicating cavity 10 through the micro holes 11; a safety valve 12 is provided on the press cap 8 to relieve pressure when the communicating cavity 10 is over-pressured; an L-shaped positioning plate 13 is provided at a bottom of the metamaterial structure layer 3; an L-shaped positioning groove is arranged at the bottom of the waveguide section 21, which matches with the L positioning plate 13. With the foregoing structure, there are several micro-holes 11 on the concave circular groove 9, and the L-shaped positioning plate 13 is arranged at the bottom of the metamaterial structure layer 3. When the L-shaped positioning plate 13 is matched in the L-shaped positioning groove, a position and an angle of the metamaterial structure layer 3 are uniquely determined, which are adjusted during designing in advance to ensure a best effect and avoid the need to adjust the position of the metamaterial structure layer 3 every time. At the same time, each of the hollow cavities 6 corresponds to one of the micro holes 11 communicating with the communicating cavity 10. The accommodation space 4 also communicates with the communicating cavity 10 through corresponding micro holes 11. When the air pressure in the hollow cavities 6 or the accommodation space 4 is too high, the air enters the communicating cavity 10 through the micro holes 11, and then the pressure is released through the safety valve 12 to ensure safety. The micro holes 11 are very small and like a cut-off waveguide, so the microwaves will not escape therefrom. During working, the press cap 8 is opened, and the metamaterial structure layer 3 is put into the waveguide section 21 from the opening 7 at the top of the waveguide section 21; the metamaterial structure layer 3 is positioned on the L-shaped positioning groove at the bottom of the waveguide section 21 through the L-shaped positioning plate 13, and then the press cap 8 is closed so that the concave circular groove 9 at the bottom of the press cap 8 fits on the top of the metamaterial structure layer 3. At this time, each of the hollow cavities 6 corresponds to one of the micro holes 11 communicating with the communicating cavity 10, and the accommodation space 4 also communicates with the communicating cavity 10 through corresponding micro holes 11. The microwaves are converged in the accommodation space 4 when passing through the metamaterial structure layer 3. When the air pressure in the hollow cavities 6 or the accommodation space 4 is too high, the air enters the communicating cavity 10 through the micro holes 11, and then the pressure is released through the safety valve 12.

The two ends of the absorption tube 16 are connected to an inlet tube 17 and an outlet tube 19 respectively; the inlet tube 17 and the outlet tube 19 are wrapped with metal sleeves. With the foregoing structure, the flowing water in the absorption tube 16 flows in from the inlet tube 17 and then flows out from the outlet tube 19. the inlet tube 17 and the outlet tube 19 are wrapped with the metal sleeves to prevent the microwaves from escaping from the inlet tube 17 and the outlet tube 19, so that the microwaves are constantly reflected in the inlet tube 17 and the outlet tube 19 and are fully absorbed by the water.

The above descriptions are only the preferred embodiments of the present invention and not intended to be limiting. Any equivalent structure or equivalent process transformation made by learning the contents of the description and the drawings of the present invention, or directly or indirectly applications to other related technical field are equally included in the protection scope of the present invention.

What is claimed is:

1. A microwave heating device with reflection protection, comprising:

a microwave generator (22), a circulator (23), a water load (24), a microwave transmission device (25), and a reaction chamber (26);

wherein a first port of the circulator (23) is connected to the microwave generator (22), and a second port of the circulator (23) is connected to the microwave transmission device (25); the microwave transmission device (25) is connected to the reaction chamber (26); the water load (24) comprises a waveguide section (21), a metamaterial structure layer (3) and an absorption tube (16); one end of the waveguide section (21) is connected to a third port of the circulator (23), and the other end is sealed by a metal plate; the metamaterial structure layer (3) is arranged in the waveguide section (21); a center of the metamaterial structure layer (3) has an accommodation space (4); the absorption tube (16) is arranged along an internal wall of the accommodation space (4) with a spiral extending form; both ends of the absorption tube (16) penetrate the waveguide section (21), and water flows in the absorption tube (16); relative dielectric constants of materials forming the metamaterial structure layer (3) gradually increase from outside to inside, so that microwaves passing through the metamaterial structure layer (3) are converged in the accommodation space (4);

wherein the metamaterial structure layer (3) comprises multiple ring columns (5) nested in sequence from inside to outside; the accommodation space (4) is a cylindrical space with a radius of r; a radius of the metamaterial structure layer (3) is R; a relative dielectric constant of an external space of the metamaterial structure layer (3) is $\varepsilon_0$; the relative dielectric constants at each position point of the metamaterial structure layer (3) constitutes a step function; a distance between the position point and a center of the accommodation space (4) is d, and R>d>r; each step of the step function intersects with another function $\varepsilon(d)=\varepsilon_0(R/d)^2$.

2. The microwave heating device, as recited in claim 1, wherein each of the ring columns (5) has multiple hollow cavities (6), and two ends of the multiple hollow cavities (6) are extended to a top surface and a bottom surface of a corresponding ring column (5) respectively.

3. The microwave heating device, as recited in claim 2, wherein cross sections of the hollow cavities (6) of an outer ring column (5) are larger than cross sections of the hollow cavities (6) of an inner ring column (5).

4. The microwave heating device, as recited in claim 3, wherein the hollow cavities (6) of the ring columns (5) are evenly spaced; a quantity of the hollow cavities (6) on each of the ring columns (5) is equal.

5. The microwave heating device, as recited in claim 4, wherein cross sections of the hollow cavities (6) are circular, elliptical or polygonal.

6. The microwave heating device, as recited in claim 5, wherein an opening (7) is arranged at a top of the waveguide section (21), and a press cap (8) covers the opening (7); a concave circular groove (9) is provided at a bottom of the press cap (8), which is fitted on a top of the metamaterial structure layer (3); the metamaterial structure layer (3) is sandwiched between the press cap (8) and a bottom of the waveguide section (21).

7. The microwave heating device, as recited in claim 6, wherein the press cap (8) has a communicating cavity (10); the concave circular groove (9) has multiple micro holes (11), in such a manner that all the hollow cavities (6) as well as the accommodation space (4) communicate with the communicating cavity (10) through the micro holes (11); a safety valve (12) is provided on the press cap (8) to relieve pressure when the communicating cavity (10) is over-pressured; an L-shaped positioning plate (13) is provided at a bottom of the metamaterial structure layer (3); an L-shaped positioning groove is arranged at the bottom of the waveguide section (21), which matches with the L positioning plate (13).

8. The microwave heating device, as recited in claim 7, wherein the two ends of the absorption tube (16) are connected to an inlet tube (17) and an outlet tube (19) respectively; the inlet tube (17) and the outlet tube (19) are wrapped with metal sleeves.

* * * * *